Patented July 20, 1943

2,324,762

UNITED STATES PATENT OFFICE 2,324,762

ISOMERIZATION PROCESS

Van B. Calhoun and Kenneth C. Laughlin, Baton Rouge, La., assignors to Standard Oil Development Company, a corporation of Delaware No Drawing. Application November 30, 1940, Serial No. 367,951

9 Claims. (Cl. 260—683.5)

The present invention relates to a process of isomerizing normal or straight chain paraffins containing at least 4 carbon atoms per molecule into their corresponding branched chain paraffinic isomers. The invention is likewise applicable to the conversion of branched chain paraffins into the corresponding straight chain isomers. This reaction is accomplished in the presence of a novel isomerization catalyst.

Numerous processes have heretofore been proposed for converting normal paraffins into isoparaffins. The customary catalysts employed are selected from the group known as the Friedel-Crafts type of catalysts such as, for example, aluminum chloride, aluminum bromide, zinc chloride, iron chloride and bromide, and the like. These catalysts have been found to be quite active for the desired purpose, particularly where the reaction is carried out in the presence of activators such as, for example, water and/or hydrogen halides such as hydrogen chloride, hydrogen bromide and the like. Other activators such as carbon tetrachloride, butyl chloride, molecular chlorine and the like, have also been employed. However, the corrosiveness of this mixture together with the rather rapid rate of decreasing catalytic activity make it something less than an ideal catalyst for the reaction, particularly from a commercial standpoint.

It has now been discovered that the isomerization of straight chain paraffins having at least 4 carbon atoms per molecule into branched chain paraffins can be effected in the presence of a catalyst composed of metallic nickel, cobalt or iron deposited or impregnated upon a hydrohalide-treated clay such as, for example, Super Filtrol, bentonite, montmorillonite, Marsil, or some other suitable similar type of clay. It has been discovered that the activity of the catalyst has been further enhanced by the addition of substantial amounts of free hydrogen to the reaction. The activity of the metallic constituent of the catalyst appears to be highest where the metallic constituent is prepared in situ, that is by the impregnation of a readily reducible salt of the desired metal into the Super Filtrol or other suitable clay and the reduction of this salt by means of hydrogen to give a reduced metal impregnated or contained in the clay. Furthermore, these catalysts appear to be particularly useful in isomerizing the indicated feeds containing substantial amounts of normal paraffins and where those feeds may contain small amounts of sulfur and/or sulfur compounds. The catalyst apparently is less affected by the sulfur and does not appear to suffer from sulfur poisoning to the extent of many of the other catalysts which might otherwise be found to be useful in isomerization reactions of this character.

The exact chemical composition of the catalyst is not at present known. However, it is felt that this is of no particular importance since its preparation is readily understood. For example, a catalyst composition prepared in accordance with the present invention is made by further treating Super Filtrol or some other suitable clay which has been previously treated with sulfuric acid, hydrochloric acid, or some other suitable acid solution to acid leach the material followed by removal of the solubilized impurities therefrom. The acid activated clay is then treated with at least one hydrogen halide, for example hydrogen bromide or hydrogen fluoride as such or in suitable solution, and after drying may then have absorbed therein an aqueous solution of a suitable iron, cobalt or nickel salt such as, for example, the nitrates, sulfates or halides of these metals or some other readily reducible water-soluble salt of the desired metal. The amount of desired metal salt introduced may vary between about 2% and about 35% based on the weight of the clay impregnated. The impregnating solutions are of such concentrations that they are able to wet the clay carrier sufficiently to enable one to extrude the catalyst mass in desired form prior to further treatment. After the desired quantity of metal salt has been introduced, the mass is dried and heated to about 700–800° F. and then heated in the presence of elemental or free hydrogen at a temperature of around 500–900° F. for a period of time sufficient to substantially completely reduce the intermediate metal oxide, leaving behind reduced metal. If desired, the vehicle for impregnating the metal salt need not be water but may be alcohol or some other suitable solvent for the metal salt. In some instances the salt involved is not readily soluble in water and it may be desirable therefore to employ the usual organic solvents if they serve as a suitable vehicle for impregnating the salt in the clay.

The feed stock employed may be normal butane, normal pentane, normal hexane, normal heptane, normal octane and higher straight chain paraffinic homologues or mixtures of two or more of these homologues. It is not necessary that the feed stock be wholly straight chain paraffins in character but for best results the feed stock should predominate in straight chain paraffinic compounds. Thus, for example, straight run naphthas, which may be relatively free of olefins and aromatics, are desirable as feed stocks in the present process. Field butanes, refinery C4 and C5 cuts from which the olefinic content may have been previously removed, that is, in those cases where these stocks come from thermal or catalytic cracking units, and similar straight chain paraffinic hydrocarbon mixtures found in the modern petroleum refinery are all suitable feed stocks for the present process. Where hydrogen is employed, it is not always necessary to remove olefins and/or aromatics from the feed stock prior to the isomerization treatment.

A temperature for carrying out the reaction may range from about 450° F. to about 800° F., with a preferred range when employing the more reactive catalyst masses of between about 550° F. and 700° F. The time of contact of course will vary and will be correlated with the particular catalyst employed, the particular feed stock employed and the temperature under which the reaction is maintained. In general and for batch operation, times of contact varying between about 2 hours and about 14 hours may be employed, preferably between about 8 and about 12 hours. In continuous operation, a time of contact between about 0.5 and about 4 hours is sufficient. The shorter contact time is preferred in continuous operations because of the fact that several times as much catalyst based on the feed in the reactor at any one time is used for continuous as compared to batch operation.

The amount of catalyst employed in any particular reaction may vary considerably. For best results, however, the amount of catalyst present based upon the total amount of hydrocarbon present in the reactor at any one time may vary between about 35% and about 100%, particularly where the reaction is carried out in batch operation and where a slurry of catalyst in liquid phase reactants is desired. Sufficient superatmospheric pressure to maintain liquid phase operation is sometimes desirable. However, from a continuous and commercial standpoint the process readily lends itself to a bed type reaction in which the catalyst is deposited as a bed in a reaction tower through which either the vapors or the liquid may be percolated. At the temperatures employed, however, the lower isomerizable paraffins are not capable of being maintained in the liquid phase since the desired reaction temperatures are far above the critical temperatures of the respective reactants such as, for example, normal butane and normal pentane. However, in connection with the isomerizing of straight run naphthas and the heavier straight chain paraffinic series members such as, for example, normal heptane, sufficient superatmospheric pressure may be applied to the reaction, particularly when introducing elemental or free hydrogen into the reaction, to maintain a satisfactory liquid phase operation.

The amount of hydrogen maintained in the reaction zone is usually measured with reference to the increase in pressure occasioned by the introduction of the free or elemental hydrogen into the reaction zone. It is desirable to have from about 100 to about 700 lbs./sq. in. of free hydrogen pressure maintained in the reaction chamber, although for preferred operation a pressure of between about 100 and about 300 lbs./sq. in. of hydrogen pressure is desired.

Any suitable type of catalytic reactor customarily employed in chemical reactions may be employed, particularly the types of reactors customarily employed in catalytic refining operations where the catalyst is of the solid type. In the liquid phase operation care should be taken to insure the intensive agitation of the liquid when in contact with the catalyst mass or bed, and if desired the bed may be of the rotating type to insure this agitation, or jets of restricted internal diameter may be employed in order to insure intimate contact for the feed stock coming into the reactor containing the catalyst mass.

As illustrative of methods of carrying out the process the following examples are given:

*Example 1*

Five hundred grams of normal pentane were placed in a pressure autoclave together with about 200 grams of a catalyst composition prepared by treating Super Filtrol with hydrogen fluoride, impregnating therein nickel nitrate and reducing the nickel nitrate with hydrogen to metallic nickel. To this mixture there was added about 100 lbs./sq. in. of free hydrogen pressure and the autoclave was vigorously shaken first at room temperature and then at 654° F., at which latter temperature the autoclave was held for about 12 hours. Upon cooling the autoclave, the product was removed and it was found that the composition of the final product amounted to 4% of $C_4$ and lighter hydrocarbons, 48% of isopentane, 43% of normal pentane and 5% of $C_6$ and heavier hydrocarbons. This indicated that 57% of the normal pentane reacted; that of this 57% which reacted only minor portions were decomposed to give $C_4$ and lighter hydrocarbons and $C_6$ and heavier hydrocarbons.

*Example 2*

When employing the same type of catalyst under substantially the same reaction conditions as described in Example 1 except that the feed stock was normal heptane, a product was obtained about 70% to 80% of which boiled between about 191° F. and about 208° F. The entire product when added to a reference fuel having a 65 A. S. T. M. octane number to make a 50–50 blend therewith had an octane blending value of about 51, indicating that a very considerable percentage of the original normal heptane had been converted into isoheptane and to some extent to lower boiling isoparaffins. Normal heptane has an octane blending value of zero. The boiling point of normal heptane is about 209° F., and that of isoheptane about 194° F.

The expression, "a hydrofluoric-acid-treated mineral-acid-treated clay," or its equivalent when used in the claims is intended to cover catalyst masses prepared from clays which have been treated with a mineral acid other than hydrofluoric acid followed by a further treatment with hydrofluoric acid.

Having now thus fully described and illustrated the nature of the invention, what is claimed as new and useful and desired to be secured by Letters Patent is:

1. A process for isomerizing paraffinic hydrocarbons which comprises contacting at least one paraffinic hydrocarbon containing at least four carbon atoms per molecule with a catalyst composition comprising a hydrofluoric-acid-treated mineral-acid-treated clay containing at least one metal taken from the eighth group, fourth series, of the periodic table in the presence of added free hydrogen under isomerization reaction conditions.

2. A process which comprises contacting at least one straight chain paraffinic hydrocarbon containing at least four carbon atoms per molecule with a catalyst composition comprising metallic nickel impregnated on hydrofluoric-acid-treated mineral-acid-treated clay at a temperature between about 450° F. and 900° F. for a period of time sufficient to effect substantial isomerization while in the presence of at least 100 lbs./sq. in. of free hydrogen pressure.

3. The process which comprises contacting a straight run naphtha relatively free of aromatics and olefins with a catalyst composition of metallic nickel impregnated on hydrofluoric-acid-treated mineral-acid-treated bentonitic type clay at a temperature between about 450° F. and about 900° F. for a period of time between about 8 and about 12 hours in the presence of between about 100 and about 700 lbs./sq. in. of free hydrogen pressure, and correlating the above reaction conditions to effect a substantial increase in octane number without an attendant substantial decomposition of the feed stock.

4. A process which comprises contacting a naphtha comprising essentially acyclic hydrocarbons of at least 4 carbon atoms per molecule with a catalyst composition of metallic nickel impregnated on hydrofluoric-acid-treated mineral-acid-treated bentonitic type clay at a temperature between about 450° F. and about 900° F. for a period of time between about 8 and about 12 hours in the presence of between about 100 and 700 lbs./sq. in. of free hydrogen pressure.

5. A process as in claim 3 wherein the reaction is carried out continuously while employing a bed of catalyst and wherein the time of contact is between about 0.5 and about 4 hours.

6. The process which comprises contacting normal pentane with metallic nickel impregnated on hydrofluoric-acid-treated mineral-acid-treated bentonitic type clay in the presence of about 100 lbs./sq. in. of free hydrogen pressure at a temperature of about 654° F. for about twelve hours, and recovering isopentane from the reacted mixture.

7. A process as in claim 6 wherein the reaction is carried out continuously and the catalyst is maintained in a bed type reactor.

8. A process which comprises contacting normal heptane with a catalyst comprising metallic nickel impregnated on hydrofluoric-acid-treated mineral-acid-treated bentonitic type clay at a temperature of between about 550° F. and about 700° F. for a period of time between about 8 and about 12 hours under sufficient superatmospheric pressure to mantain liquid phase, said pressure being attained by the introduction of free hydrogen, and correlating the reaction conditions to obtain a substantial amount of branched chain hydrocarbons without the attendant decomposition of the feed stock to any substantial extent, and recovering the branched chain paraffins from the reaction mixture.

9. The process which comprises contacting normal pentane with metallic nickel impregnated on hydrofluoric-acid-treated mineral-acid-treated bentonitic type clay in the presence of between about 100 and about 300 lbs./sq. in. of added free hydrogen pressure at a temperature between about 550° F. and about 750° F. for a sufficient length of time to effect the substantial isomerization of normal pentane to isopentane, and recovering isopentane from the reacted mixture.

VAN B. CALHOUN.
KENNETH C. LAUGHLIN.